United States Patent
Li et al.

(10) Patent No.: US 8,442,160 B2
(45) Date of Patent: *May 14, 2013

(54) ADAPTIVE TIME-FILTERING FOR CHANNEL ESTIMATION IN OFDM SYSTEM

(75) Inventors: Linbo Li, San Diego, CA (US); Ashok Mantravadi, San Diego, CA (US); Fuyun Ling, San Diego, CA (US); Krishna Kiran Mukkavilli, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/939,118

(22) Filed: Nov. 3, 2010

(65) Prior Publication Data
US 2011/0051618 A1    Mar. 3, 2011

Related U.S. Application Data

(63) Continuation of application No. 11/248,976, filed on Oct. 11, 2005, now Pat. No. 7,848,463.

(60) Provisional application No. 60/669,683, filed on Apr. 7, 2005.

(51) Int. Cl.
*H04L 27/06* (2006.01)

(52) U.S. Cl.
USPC .......... 375/340; 375/260; 375/267; 375/341; 375/343; 375/350

(58) Field of Classification Search ........... 375/136, 375/143, 147, 152, 232, 260, 267, 340–341, 375/343, 347, 350, 262, 342, 346
See application file for complete search history.

(56) References Cited

U.S. PATENT DOCUMENTS

| | | | |
|---|---|---|---|
| 6,862,325 B2 | 3/2005 | Gay-Bellile et al. | |
| 6,954,618 B2 | 10/2005 | Bonhomme | |

(Continued)

FOREIGN PATENT DOCUMENTS

| | | |
|---|---|---|
| EP | 1580948 | 9/2005 |
| GB | 2276064 | 9/1994 |

(Continued)

OTHER PUBLICATIONS

International Search Report, PCT/US2006/012843, International Searching Authority, European Patent Office, Nov. 15, 2006.

(Continued)

*Primary Examiner* — Hirdepal Singh
(74) *Attorney, Agent, or Firm* — Fulbright & Jaworski L.L.P.

(57) ABSTRACT

Time filtering channel estimates in a wireless communication system, such as an Orthogonal Frequency Division Multiplex (OFDM) system, can be used to improve the quality of channel estimates. The characteristics of an optimal channel estimate time filter can depend on the manner in which the channel estimate is determined as well as the time correlation of channel estimates. A receiver can implement an adaptive time filter for channel estimates in which the time filter response can vary based on channel estimate parameters. The channel estimate parameters can include the manner of determining channel estimates, a time correlation of channel estimates, and an estimated Doppler frequency. The time filter response can be varied continuously over a range of responses or can be varied discretely over a predetermined number of time filter responses.

74 Claims, 5 Drawing Sheets

U.S. PATENT DOCUMENTS

| | | |
|---|---|---|
| 6,973,144 B1 | 12/2005 | Zhu et al. |
| 7,065,375 B2 | 6/2006 | Bonhomme |
| 7,116,981 B2 | 10/2006 | Jeon et al. |
| 7,180,956 B1 | 2/2007 | Banister |
| 7,333,540 B2 * | 2/2008 | Yee ................. 375/232 |
| 7,376,210 B2 | 5/2008 | Kim et al. |
| 7,388,922 B2 * | 6/2008 | Yamagata ............ 375/260 |
| 7,397,758 B1 | 7/2008 | Hart et al. |
| 7,486,726 B2 * | 2/2009 | Alexander et al. .......... 375/232 |
| 7,672,383 B2 | 3/2010 | Namgoong et al. |
| 7,848,463 B2 | 12/2010 | Li et al. |
| 7,907,593 B2 * | 3/2011 | Vijayan et al. ............ 370/350 |
| 8,170,083 B2 * | 5/2012 | Pan ................. 375/147 |
| 2002/0001352 A1 * | 1/2002 | Stirling-Gallacher et al. ................. 375/260 |
| 2002/0037058 A1 | 3/2002 | Birru |
| 2002/0042279 A1 | 4/2002 | Da Rocha et al. |
| 2002/0172184 A1 * | 11/2002 | Kim et al. ............ 370/344 |
| 2003/0060164 A1 | 3/2003 | Bonhomme |
| 2003/0060167 A1 | 3/2003 | Bonhomme |
| 2005/0073949 A1 * | 4/2005 | Hayashi ............ 370/208 |
| 2005/0105647 A1 * | 5/2005 | Wilhelmsson et al. ........ 375/316 |
| 2005/0135324 A1 * | 6/2005 | Kim et al. ............ 370/343 |
| 2005/0159120 A1 * | 7/2005 | Garg et al. ............ 455/132 |
| 2005/0163258 A1 * | 7/2005 | Gore et al. ............ 375/340 |
| 2005/0185743 A1 | 8/2005 | Li |
| 2005/0213679 A1 * | 9/2005 | Yamagata ............ 375/260 |
| 2005/0213680 A1 | 9/2005 | Atungsiri et al. |
| 2005/0265490 A1 | 12/2005 | Sestok et al. |
| 2006/0045194 A1 * | 3/2006 | Athanasios et al. ........ 375/260 |
| 2006/0128326 A1 | 6/2006 | Pietraski |
| 2006/0227812 A1 * | 10/2006 | Vrcelj et al. ............ 370/503 |
| 2008/0031375 A1 | 2/2008 | Zhou et al. |
| 2010/0158149 A1 | 6/2010 | Gorokhov |
| 2011/0026619 A1 * | 2/2011 | Kent et al. ............ 375/260 |
| 2012/0076193 A1 * | 3/2012 | Kolze et al. ............ 375/232 |

FOREIGN PATENT DOCUMENTS

| | | |
|---|---|---|
| JP | 10075226 | 3/1998 |
| JP | 2002261729 | 9/2002 |
| JP | 2003101503 | 4/2003 |
| JP | 2003152669 | 5/2003 |
| JP | 2003174429 | 6/2003 |
| JP | 200545664 | 2/2005 |
| JP | 2006005396 | 1/2006 |
| JP | 2006506024 | 2/2006 |
| JP | 2006515481 | 5/2006 |
| KR | 1020030042103 | 5/2003 |
| KR | 1020030074891 | 9/2003 |
| KR | 1020040050813 | 6/2004 |
| WO | WO2004023672 | 3/2004 |
| WO | WO2004073276 A1 | 8/2004 |
| WO | WO2004086706 A1 | 10/2004 |
| WO | WO2004114615 A1 | 12/2004 |
| WO | WO2006075732 | 7/2006 |
| WO | WO2006093307 A1 | 9/2006 |
| WO | WO2006098147 A1 | 9/2006 |

OTHER PUBLICATIONS

Chang, Ming-Xian et al.: "Model-Based Channel Estimation for OFDM Signals in Rayleigh Fading," IEEE Transactions on Communications, IEEE Service Center, vol. 50, No. 4, pp. 540-544, 2002-04.

Written Opinion, PCT/US2006/012843, International Searching Authority, European Patent Office, Nov. 15, 2006.

K. Yokomakura, et al., "A study on Channel Estimation for DPC-OFTTDMA systems", IEEE technical report, IEEE, Jan. 20, 2005, RCS2004-263, vol. 104, No. 595, pp. 25-30.

* cited by examiner

ADAPTIVE TIME-FILTERING FOR CHANNEL ESTIMATION IN OFDM SYSTEM

CROSS-REFERENCE TO RELATED APPLICATIONS

This application is a continuation of U.S. patent application Ser. No. 11/248,976, filed Oct. 11, 2005, issued as U.S. Pat. No. 7,848,463 Dec. 7, 2010, which claims the benefit of U.S. Provisional Application No. 60/669,683, filed Apr. 7, 2005, both of which are incorporated by reference herein.

BACKGROUND OF THE INVENTION

Wireless communication systems allow communication links to be established between devices at relatively large distances without the need for a wired infrastructure linking the devices. A wireless communication system can allow a communication link to be established from virtually any location. A number of operating conditions may affect the signal quality for any particular wireless communication link. Some factors include distance, topology of the landscape and surrounding areas, weather conditions, potential interference sources, as well as other external conditions over which the participants in a wireless communication link typically have little control. Multiple devices of a particular wireless communication link may be optimized for a typical operating environment, taking into account the effects of various operating conditions and the probability that any individual device will experience those operating conditions. For example, consumer communication devices may be optimized for a typical operating environment. In other wireless communication systems, a particular wireless communication link may be optimized for particular operating conditions. For example, a point-to-point microwave communication link may be optimized for parameters affected by geography or potential interference sources.

However, in a wireless communication system, one or more of the communication devices participating in a communication link may be a portable or otherwise mobile device. As such, the operating conditions experienced by the mobile communication device will vary over time, and may vary significantly over the course of a communication session. Additionally, mobility may itself contribute to operating conditions that need to be considered by the communication devices. Mobility of one communication device participating in a wireless communication link will be seen by all participants as a relative velocity, contributing to a Doppler shift of the signals communicated between the participants.

It is desirable to optimize a wireless communication device over all operating conditions. Additionally, it may be advantageous to optimize the operation of each wireless communication device without adversely affecting the operation of any other communication devices that may not even be participating in the same communication link.

BRIEF SUMMARY OF THE INVENTION

Time filtering channel estimates in a wireless communication system, such as an Orthogonal Frequency Division Multiplex (OFDM) system, can be used to improve the quality of channel estimates. The characteristics of an optimal channel estimate time filter can depend on the manner in which the channel estimate is determined as well as the time correlation of channel estimates. A receiver can implement an adaptive time filter for channel estimates in which the time filter response can vary based on channel estimate parameters. The channel estimate parameters can include the manner of determining channel estimates, a time correlation of channel estimates, and an estimated Doppler spread. The time filter response can be varied continuously over a range of responses or can be varied discretely over a predetermined number of time filter responses.

Disclosed is an embodiment of a method of optimizing channel estimates for decoding signals from a communication link in a wireless communication system. The method includes determining a channel variation. The method also includes varying a channel estimate time filter characteristic based in part on the channel variation, and filtering at least one channel estimate according to the channel estimate time filter characteristic.

Disclosed is another embodiment of a method of optimizing channel estimates for decoding signals from a communication link in a wireless communication system. The method includes filtering a channel estimate using each of a plurality of channel estimation time filters to generate a plurality of time filtered channel estimates, selecting one of the plurality of channel estimation time filters, and decoding a received symbol using a time filtered channel estimate from the selected one of the plurality of channel estimation time filters.

Also disclosed is an embodiment of a method of optimizing channel estimates for decoding signals from a communication link in a wireless communication system. The method includes receiving an Orthogonal Frequency Division Multiplex (OFDM) symbol comprising at least one pilot subcarrier, converting the received symbol to a plurality of subcarriers, extracting at least one pilot subcarrier corresponding to the pilot. The method further includes determining a channel estimate based at least in part on the at least one pilot subcarrier, determining a channel variation based on the channel estimate, controlling a time filter to provide a channel estimate time filter response based on the channel variation, and filtering the channel estimate with the time filter.

Also disclosed is an embodiment of an apparatus for optimizing channel estimates for decoding signals from a communication link in a wireless communication system. The apparatus includes a receiver front end configured to receive a symbol over the communication link, a channel estimator coupled to the receiver and configured to determine a channel estimate based on the received symbol, an adaptive time filter coupled to the channel estimator and configured to time filter the channel estimate, and a switching criteria module coupled to the adaptive time filter and configured to control a time filtering characteristic of the adaptive time filter.

Disclosed is an embodiment of an apparatus for optimizing channel estimates for decoding signals from a communication link in a wireless communication system. The apparatus includes a first transform module configured to transform a plurality of time domain samples to a plurality of frequency domain subcarriers, a channel estimator coupled to the first transform module and configured to operate on a first subset of the frequency domain subcarriers to generate a channel estimate, an adaptive time filter coupled to the channel estimator and configured to time filter the channel estimate to produce a time filtered channel estimate, a switching criteria module configured to determine an operating condition and control a time filtering characteristic of the adaptive time filter, a data extraction module coupled to the first transform module and configured to extract a second subset of the plurality of frequency domain subcarriers corresponding to data subcarriers, and a demodulator coupled to the data extraction module and the adaptive time filter and configured to demodulate the data subcarriers using the time filtered channel estimate.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

A wireless receiver can estimate the wireless channel and use the channel estimate when demodulating the received signal. A time filter can be used to filter a plurality of channel estimates. The time filter can be an adaptive filter, and the adaptive filter response can be varied depending on one or more parameters. The one or more parameters can include discrete commands or instructions, such as software instructions, receiver modes, or other discrete parameters or combination of discrete parameters. The one or more parameters can be determined dynamically, and can include parameters such as channel estimate correlation, receiver Doppler spread, or other dynamic parameters or combinations of dynamic parameters. In other embodiments, the parameters can include one or more discrete parameters combined with one or more dynamic parameters.

The adaptive filter can be implemented with a continuously variable response, a predetermined number of discrete responses, or a combination of continuously variable response over one or more ranges in combination with one or more discrete filter responses. Where a plurality of predetermined discrete filter responses are implemented within the receiver, the receiver can process received signals through parallel signal paths, with each signal path corresponding to one of the plurality of predetermined discrete filter responses. The receiver can then select one filter output from the plurality of filter responses. In another embodiment, the receiver can configure the time filter to one or a plurality of filter responses based on the parameters. For example, the receiver can select a tap length and set of filter tap weights from a predetermined number of filter responses. In another embodiment, the receiver can be configured to vary a filter response, for example, by varying one or more filter tap weights over a continuously variable range.

Figure 1:
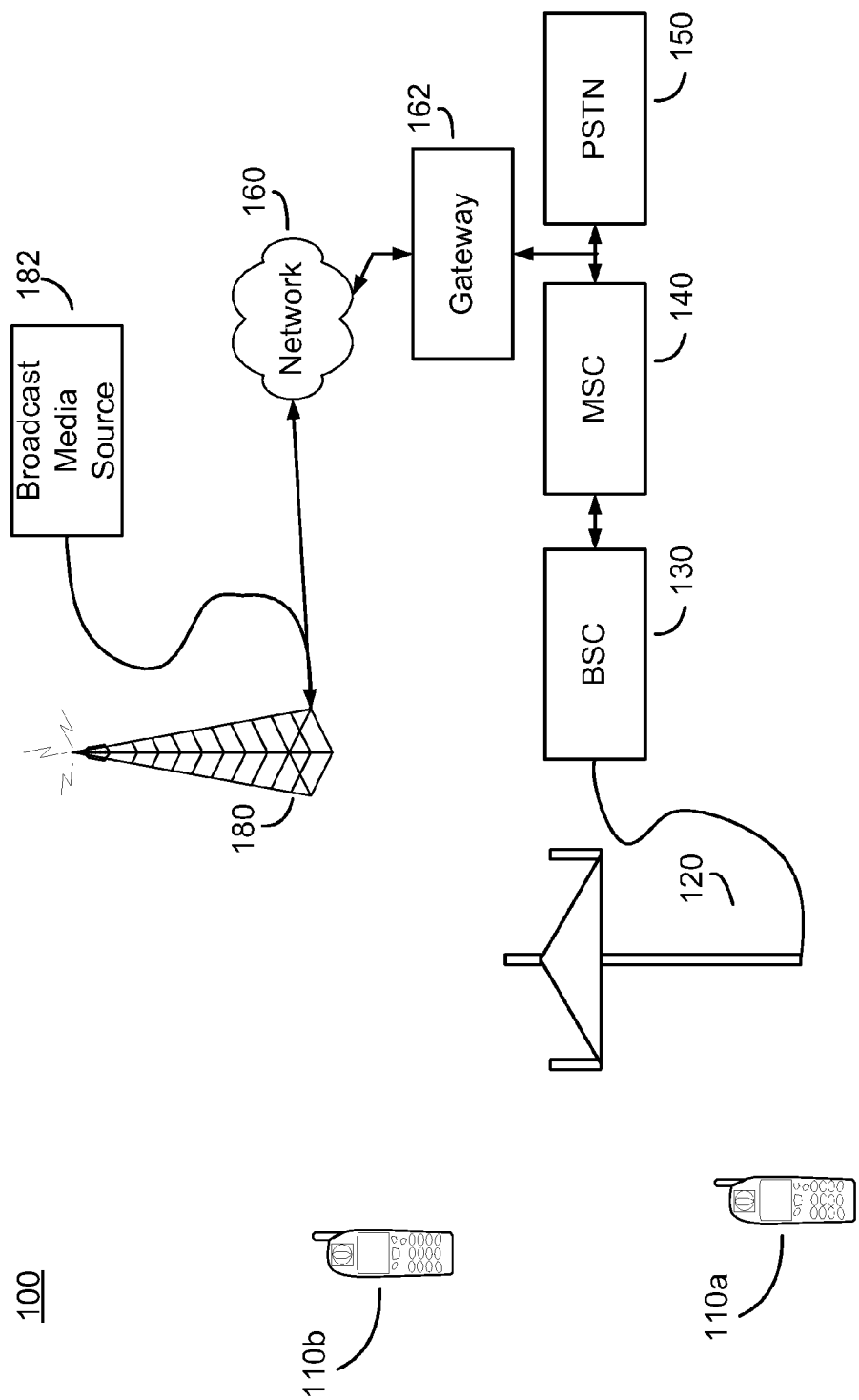
FIG. 1 is a simplified functional block diagram of an embodiment of a wireless communication system.

FIG. 1 is a functional block diagram of an embodiment of a wireless communication system 100 having communication devices with receivers that implement adaptive filtering of channel estimates. The system includes one or more fixed elements that can be in communication with a plurality of user terminals 110a-110b. Although only two user terminals 110a and 110b are depicted in the system 100, it is generally understood that the wireless communication system 100 can typically communicate with greater than two user terminals 110a and 110b.

Each of the user terminals 110a-110b can be, for example, a wireless communication device such as a wireless telephone configured to operate according to one or more communication standards. The user terminal, for example 110a, can be a portable unit, a mobile unit, or a stationary unit. The user terminal 110a may also be referred to as a mobile unit, a mobile terminal, a mobile station, user equipment, a portable, a phone, and the like.

User terminal 110a typically communicates with one or more base stations 120, here depicted as a sectored cellular tower. The user terminal 110a will typically communicate with the base station 120 that provides the strongest signal strength at a receiver within the user terminal 110a.

Base station 120 can be coupled to a Base Station Controller (BSC) 130 that routes communication signals to and from the appropriate base station 120. The BSC 130 is coupled to a Mobile Switching Center (MSC) 140 that can be configured to operate as an interface between the user terminal 110a and a Public Switched Telephone Network (PSTN) 150. The MSC 140 can also be configured to operate as an interface between the user terminal 110a and gateway 162 coupled to a network 160. The network 160 can be, for example, a Local Area Network (LAN) or a Wide Area Network (WAN). In one embodiment, the network 160 includes the Internet. Therefore, the MSC 140 is coupled to the PSTN 150 and network 160. The MSC 140 can also be configured to coordinate inter-system handoffs with other communication systems (not shown). In another embodiment, the base station 120 may be referred to as a Node B. In another embodiment, the system 100 can implement a Packet Data Serving Node (PDSN) in place or in addition to the PSTN 150. The PDSN can operate to interface a packet switched network with the wireless portion of the system 100.

Each of the user terminals 110a and 110b can also be configured to communicate with a wireless station 180. The wireless station 180 can be, for example a bi-directional wireless access point, a unidirectional broadcast terminal, or some other wireless station configured to communicate with the user terminals 110a and 110b.

Wireless station 180 may operate over one or more frequency bands that can be contiguous or distinct. Additionally, a first wireless station, for example 180, may operate in a first frequency band while a second wireless station (not shown) may operate in a second frequency band distinct from the first frequency band. The user terminals 110a and 110b can be configured to support communication over multiple frequency bands corresponding to one or more wireless stations 180.

In one embodiment, the wireless station 180 can be coupled to a broadcast media source 182 that can provide media that is broadcast to one or more user terminals 110a and 110b. The wireless station 180 can also be coupled to a network 160. Although FIG. 1 depicts the wireless station 180 as coupled to the same network 160 that is coupled to the gateway 162 and MSC 140, the network 160 is not required to be the same and can be distinct. The network 160 can include one or more switches, hubs, or routers configured to allow communication to one or more communication devices (not shown) coupled to the network 160. Therefore, in some embodiments, the user terminals 110a and 110b can be configured to wirelessly communicate with one or more devices coupled to the network 160 via the wireless station 180.

Wireless station 180 can be configured to utilize OFDM communications in both the forward link and reverse link. Alternatively, where the wireless station 180 is configured to support unidirectional communications, the wireless communication may implement OFDM communications across that communication link. The term forward link refers to the communication link from the wireless station 180 to the user terminals 110*a* and 110*b*, and the term reverse link refers to the communication link from the user terminals 110*a* and 110*b* to the wireless station 180.

In systems providing for bi-directional communications, both the wireless station 180 and the user terminals 110*a* and 110*b* may allocate resources for channel and interference estimation. For example, both the wireless station 180 and the user terminals 110*a* and 110*b* may broadcast pilot signals that are used by the corresponding receivers for channel and interference estimation.

For the sake of clarity, the description of the system embodiment discusses allocation of resources for channel and interference estimation in the forward link, and adaptive time filtering of channel estimates implemented in the forward link receiver. However, it is understood that adaptive time filtering of channel estimates is not limited to application in the forward link receiver, but may be used in both the forward link receiver as well as a reverse link receiver, or may be implemented in one communication link exclusive of the other.

Wireless station 180 can be configured to broadcast a common pilot signal as a resource allocated to channel and interference estimation. The common pilot signal can include a number of tones selected from the OFDM frequency set. For example, the common pilot signal can be formed from uniformly spaced tones selected from the OFDM frequency set. The uniformly spaced configuration may be referred to as a staggered pilot signal. In other embodiments, the pilot signals can include one or more dedicated pilot signals or a combination of common pilot signals with one or more dedicated pilot signals.

A common pilot signal can include one or more sets of tones selected from the OFDM frequency set and can transmit one of the sets of tones based on a predetermined sequence or algorithm. In one embodiment, the common pilot signal can be one of two distinct tone sets, and the wireless station 180 can alternate between the two distinct tone sets. This configuration can be referred to as a staggered pilot configuration.

The common pilot signal and modulated data experience distortion and degradation attributable, in part, to the channel. The user terminals 110*a* and 110*b* can receive the common pilot signal along with modulated data from the wireless station. The time domain signal received by the user terminal can be modeled as $y(t)=s(t)*h(t)+i(t)+n(t)$, where $s(t)$, $h(t)$, $i(t)$ and $n(t)$ represent, respectively, the modulated data, the channel, the interference, and additive noise. The symbol "$*$" refers to the convolution operator.

The user terminals 110*a* and 110*b* can each determine a channel and interference estimate based on the common pilot signals, and may determine the estimate in the frequency domain, although a time domain estimate may be determined instead of, in addition to, or in combination with the frequency domain estimate. The user terminal 110 can then demodulate the received signal to recover the data.

User terminals 110*a* and 110*b* can estimate the channel using the uniformly spaced pilot tones inserted in the frequency domain in every OFDM symbol. Channel estimates based on the pilot tones occurring in each OFDM symbol may be referred to as raw channel estimates.

In some instances, it may be advantageous to obtain a longer channel estimate. For example, a longer channel estimate may be advantageous for fine timing synchronization as well as scenarios where the channel has a delay spread that is larger than a cyclic prefix used in the OFDM symbols.

The time-domain channel taps can be longer than the cyclic prefix of the OFDM system. The taps that are within the length of the cyclic prefix are referred to as the actual channel. The excess channel refers to the portion of the time-domain channel taps that exceed the length of the cyclic prefix.

The raw channel estimate, which is of length of the cyclic prefix, can be obtained based on the pilot tones in each OFDM symbol as previously described. The raw channel estimate is an aliasing of the actual channel taps and the excess channel taps. By time-filtering the raw channel estimates across one or multiple OFDM symbols with proper weights, the aliasing of the actual and the excess channel taps can be resolved. A longer channel estimate can thus be obtained by concatenating the actual channel estimate and the excess channel estimate.

Therefore, in the embodiment described above, the pilot tones are staggered across OFDM symbols. The wireless station 180 can alternately broadcast a first pilot tone set and a second pilot tone set in successive symbols. The raw channel estimates across multiple OFDM symbols can be filtered to resolve the actual and excess channels. The actual channel estimate can be combined with the excess channel estimate to produce a longer channel estimate than can be obtained using solely the actual channel. Here, the term "longer" is relative to the length of the channel estimate based solely on the actual channel.

The receiver in each user terminal 110*a* and 110*b* can implement time filtering of the channel estimates. The user terminals 110*a* and 110*b* can time filter the channel estimates to further improve the quality of the channel estimates. Time filtering of channel estimates can be used to suppress the noise variance in the channel estimate through noise averaging. Time averaging channel estimates can also operate to cancel or effectively reduce linear time variation of channel taps. Time filtering of channel estimates can also be used to cancel or effectively reduce channel aliasing and to produce a channel estimate longer than a cyclic prefix used in the OFDM symbols. The latter advantage can be particularly beneficial in the presence of excess delay spread.

The receiver performs time filtering of the channel estimates for each time domain tap individually. Filtering the channel estimates in the time domain can be particularly advantageous to allow the combination of the actual channel with the excess channel in the determination of the channel estimate. It is more difficult to filter the pilots in the frequency domain because the pilots across successive symbols may not occur in the same tones.

The optimal time filter to apply to the channel estimates can vary depending on the operating conditions of the receiver. In some conditions, a three tap filter can be advantageous, whereas in other operating conditions a single tap filter may be advantageous. When the receiver implements a multiple tap filter, the filter can be implemented as a causal filter or a non-causal filter. As used herein, the term "non-causal" refers to the use of later arriving or later derived information. For example, a non-causal time filter for a channel estimate corresponding to a particular symbol can depend on later derived channel estimates. Thus, in relation to the particular symbol time, the time filter is non-causal. The receiver in the user terminals 110*a* and 110*b* can modify the characteristics of the time filter based in part on the operating conditions.

A first user terminal 110*a* can, for example, communicate with the wireless station 180 over a first operating frequency band. Additionally, the first user terminal 110*a* can be relatively stationary while communicating with the wireless station 180.

A second user terminal 110*b* can, for example, communicate with the wireless station 180 over a second operating frequency band that is greater than the first operating frequency band. The second user terminal 110*b* can also have a velocity relative to the wireless station 180. For example, the second user terminal 110b can be located within a moving vehicle.

In the described operating conditions, the first user terminal 110 may experience substantially little or no non-linear channel variations, while the second user terminal 110b may experience significant non-linear variation of the channel. It may be advantageous for the first user terminal 110a to implement a three tap non-causal time filter for the channel estimates. However, if the second user terminal 110b experiences a relatively high velocity, a non-linear variation in the channel across symbols resulting from the relatively large Doppler spread may be significant. In such a scenario, the second user terminal 110b can advantageously adjust the channel estimate time filter to provide a single tap filter response. The single tap time filter response can provide better performance than using the three tap non-causal time filter.

The various user terminals 110a and 110b can vary the parameters of the channel estimate time filter based in part on operating conditions. The first user terminal 110a may vary the characteristics of the time filter as the first user terminal 110a becomes mobile. Similarly, the second user terminal 110b can vary the characteristics of its time filter as the velocity of the second user terminal 110b decreases or ceases.

A user terminal, for example 110a, can be configured with a plurality of predetermined time filters, and which time-filtering mode to be used can be determined by software. In another embodiment, the switching between different modes can also happen dynamically during operation of the user terminal 110a.

Velocity is used as an example of an operating condition that contributes to non-linear time variation of the channel across symbols. The user terminals 110a and 110b are not limited to varying the characteristics of the adaptive time filter based on relative velocity of the user terminal.

As described above, in one embodiment, the user terminal 110a or 110b can change the time-filtering coefficients and/or length based on the estimated Doppler spread/vehicular speed.

A user terminal 110a can estimate the Doppler spread of the channel by estimating the time-correlation of the channel taps across OFDM symbols. Specifically, the user terminal uses the channel estimates across OFDM symbols to calculate the estimated time-correlation of the channel. The estimated channel time-correlation is then compared to one or more predetermined thresholds to determine if time-filtering mode needs to be switched.

A user terminal 110a or 110b can also implement two or more sets of time-filtering blocks for channel estimation. The user terminal, for example 110a can perform noise estimation at the output of each block and use the noise estimate to determine time-filtering mode selection. Similarly, the user terminal, for example 110a, can decode symbols and determine a PER (packet-error-rate) for a plurality of time-filtering blocks, and can use the PER to select the best time-filtering mode. The user terminals 110a and 110b can also apply adaptive filtering algorithms and adapt the time-filtering coefficients.

Figure 2:
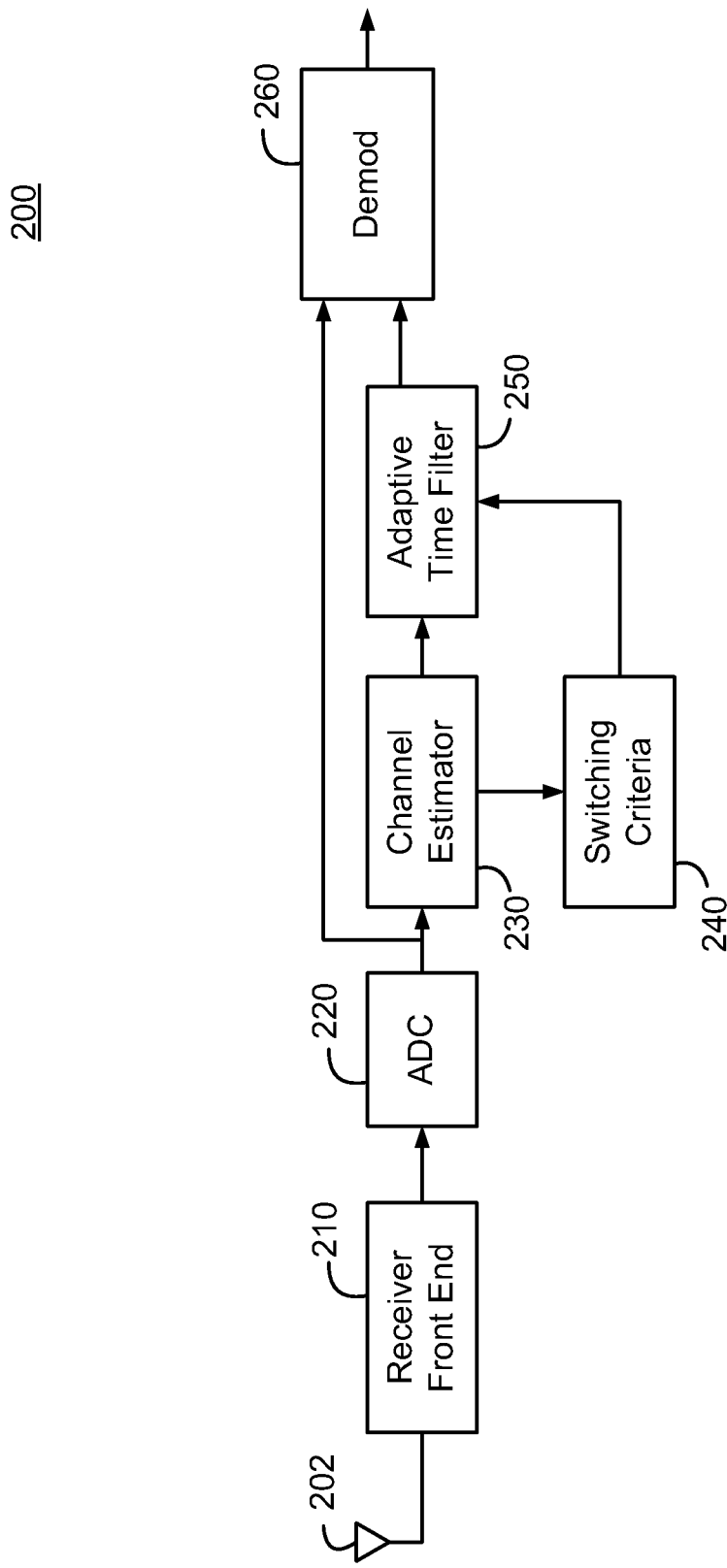
FIG. 2 is a simplified functional block diagram of an embodiment of a receiver with adaptive channel estimate time filtering.

FIG. 2 is a simplified function block diagram of an embodiment of a receiver 200 with adaptive channel estimate time filtering. The receiver 200 can be implemented, for example, in each of the user terminals 110a and 110b of the system 100 of FIG. 1 to process forward link communications from the wireless station 180. Alternatively or additionally, the receiver 200 can be implemented in the wireless station 180 of the system 100 of FIG. 1 to process reverse link communications from one or more of the user terminals 110a and 110b.

The description of the receiver 200 of FIG. 2 will be in the context of a receiver 200 configured to receive forward link communications from a wireless station. However, as noted above, the receiver 200 is not limited to forward link communications.

Receiver 200 includes an antenna 202 configured to receive the forward link signals in the operating band of interest. The receiver 200 can be configured to operate across multiple frequency bands supporting wireless communications in each of the frequency bands. For example, the antenna 202 can be configure to receive signals in the operating frequency band corresponding to a wireless telephone system. The antenna 202 can also be configured to support one or more frequency bands allocated to forward link signals from one or more wireless stations. For example, the receiver 200 may be configured to receive a first wireless signal from a first wireless station operating in a first operating frequency band, which may be, for example, an Ultra-High Frequency (UHF) frequency band. The receiver 200 can also be configured to receive a second wireless signal from a second wireless station operating in a second operating frequency band, which may be, for example, a Multi-channel Multipoint Distribution Service (MMDS) operating at microwave bands near 2.6 GHz. The antenna 202 can be configured as a multiple band antenna or can be configured as a plurality of antennae, each configured to support one or more portions of the total operating frequency bands.

Antenna 202 is coupled to a receiver front end module 210 that can be configured to tune to a channel from the operating band and process the received RF signal to a baseband or near baseband signal. The receiver front end module 210 can be configured, for example, to tune to the desired operating frequency, filter, downconvert, and amplify the received signal. For example, the receiver front end module 210 may include one or more programmable Local Oscillators (LOs) that can be selectively tuned to a desired frequency, thereby tuning the receiver front end module 210 to a desired operating frequency band.

Output from the receiver front end module 210 is coupled to an Analog to Digital Converter (ADC) 220 that is configured to convert an analog representation of the received signal to a digital representation for digital signal processing. The output of the ADC 220 is coupled to a channel estimator 230. The output of the ADC 220 can also be coupled to a demodulator 260.

Channel estimator 230 can be configured to determine a channel estimate based in part on the received signal. In one embodiment, the channel estimator 230 can be configured to estimate the channel based on a portion of the received signal that is received concurrently with portions of the received signal that convey data. For example, the received signal can be an OFDM signal and a subset of the tones can be configured as pilot tones. The channel estimator 230 can operate on the subset of tones configured as pilot tones.

In another embodiment, the received signal can be time multiplexed, and a portion of the multiplexed signal can be a pilot signal or some other predetermined signal. The channel estimator 230 can demultiplex the received signal and operate on the portion of the received signal having the pilot signal or other predetermined signal. In one embodiment, the multiplexed received signal can be a code division multiplexed signal, and a pilot signal can correspond to a predetermined code. The channel estimator 230 can extract the pilot signal from the received signal, for example through correlation, and determine the channel estimate based on the pilot signal. In another embodiment, the received signal can be a time multiplex signal, and a portion of the time multiplex signal can correspond to a pilot signal or some other predetermined signal. The channel estimator 230 can be configured to demultiplex the received signal, for example through time synchronization, to extract the pilot signal or other predetermined signal and determine the channel estimate.

An output of the channel estimator 230 or a signal or control generated or used by the channel estimator 230 can be coupled to a switching criteria module 240. The switching criteria module 240 can be configured to determine an operating condition of the receiver 200, and based at least in part on the operating condition, configure an adaptive time filter 250.

Switching criteria module 240 can include memory or buffers for storage of channel estimates. In one embodiment, the switching criteria module 240 can determine an adaptive time filter configuration based on a correlation of multiple channel estimates.

Switching criteria module 240 can also be coupled to other modules within the receiver 200. For example, the switching criteria module 240 can be coupled to the receiver front end module 210 or a controller (not shown) coupled to the receiver front end module 210. In other embodiments, the switching criteria module 240 can be configured to receive one or more inputs from multiple sources. The multiple sources can include software or user input received via a user interface. In other embodiments, the switching criteria module 240 can be configured to receive and determine the adaptive time filter configuration based at least in part on an estimated Doppler spread of the channel, a channel time variation, a noise estimate at the output of each time filtering block, a decoded packet error rate or bit error rate from the output of the demodulator, an operating frequency band, or some other criteria. For example, the switching criteria module 240 can determine an operating frequency band of the receiver front end module 210 and determine an adaptive time filter configuration based at least in part on the operating frequency band.

For example, the switching criteria module 240 may configure the adaptive time filter to a first mode or configuration if the received signal lies within an operating frequency band that is sufficiently low so as to make the effects of Doppler negligible. The switching criteria module 240 may configure the adaptive time filter to one of a plurality of alternative modes or configurations if the received signal lies within an operating frequency band that is sufficiently high so as to make Doppler effects more significant. In the second scenario, the switching criteria module 240 may consider additional factors, such as channel estimate time correlation, when determining the adaptive time filter configuration.

Switching criteria module 240 need not have knowledge of the actual operating frequency band, but can instead, make frequency dependent decisions based on a Local Oscillator (LO) control information or on some other information that correlates to operating frequency band.

In another embodiment, the switching criteria module 240 can be configured to receive user input or some other input. The switching criteria module 240 can then determine the adaptive time filter configuration based on the input. For example, the switching criteria module 240 may be coupled to a user interface that allows for software control of the adaptive time filter configuration. The user interface can be configured, for example, to provide for multiple operating modes, such as stationary, mobile, vehicle, and the like. The user can select one of the operating modes and software associated with the user interface can control the switching criteria module 240 to control the adaptive time filter to a configuration corresponding to the selected mode.

In another embodiment, the switching criteria module 240 can be configured to receive input from an external device or input (not shown). For example, the receiver 200 can be implemented in a user terminal that can function as a cellular telephone. The user device can receive or otherwise generate a control signal to the switching criteria module 240 when the user terminal is placed in a hands free car adapter. The switching criteria module 240 can then configure the adaptive time filter based on the external input.

Therefore, the characteristics of the adaptive time filter 250 can be modified dynamically or through software or hardware control modes. The output of the channel estimator is coupled to the adaptive time filter 250. The adaptive time filter 250 time filters the channel estimates based on control and parameters supplied by the switching criteria module 240.

Adaptive time filter 250 can be configured to have a plurality of predetermined configurations or modes. For example, the adaptive time filter 250 can store filter coefficients corresponding to a plurality of configurations, and the switching criteria module 240 can select the configuration. The adaptive time filter 250 can be configured to have the general form:

$$\hat{h}(k) = \sum_{n=-n_2}^{n_1} a_n h(k+n),$$

where $a_{-n_2}, \ldots, a_{n_1}$ are the time filter coefficients, and vector h(i) is the time-domain channel estimate of symbol i.

In one embodiment, the adaptive time filter 250 can store coefficients for two distinct filters. A first time filter can be a three tap non-causal filter and a second time filter can be a single tap filter. The single tap filter can essentially correspond to no time filtering of the channel estimates. In such an embodiment, the switching criteria module 240 can select between the three tap non-causal time filter and no time filtering.

The time filtered channel estimate is output from the adaptive time filter 250 to the demodulator 260. The demodulator 260 extracts the portion of the digitized received signal corresponding to the data or information and demodulates the signal using the channel estimate. The output of the demodulator 260 can be coupled to output devices (not shown) or some other destination within the receiver. By adapting the time filter characteristics, the receiver is able to optimize the channel estimate for varying operating conditions.

Figure 3:
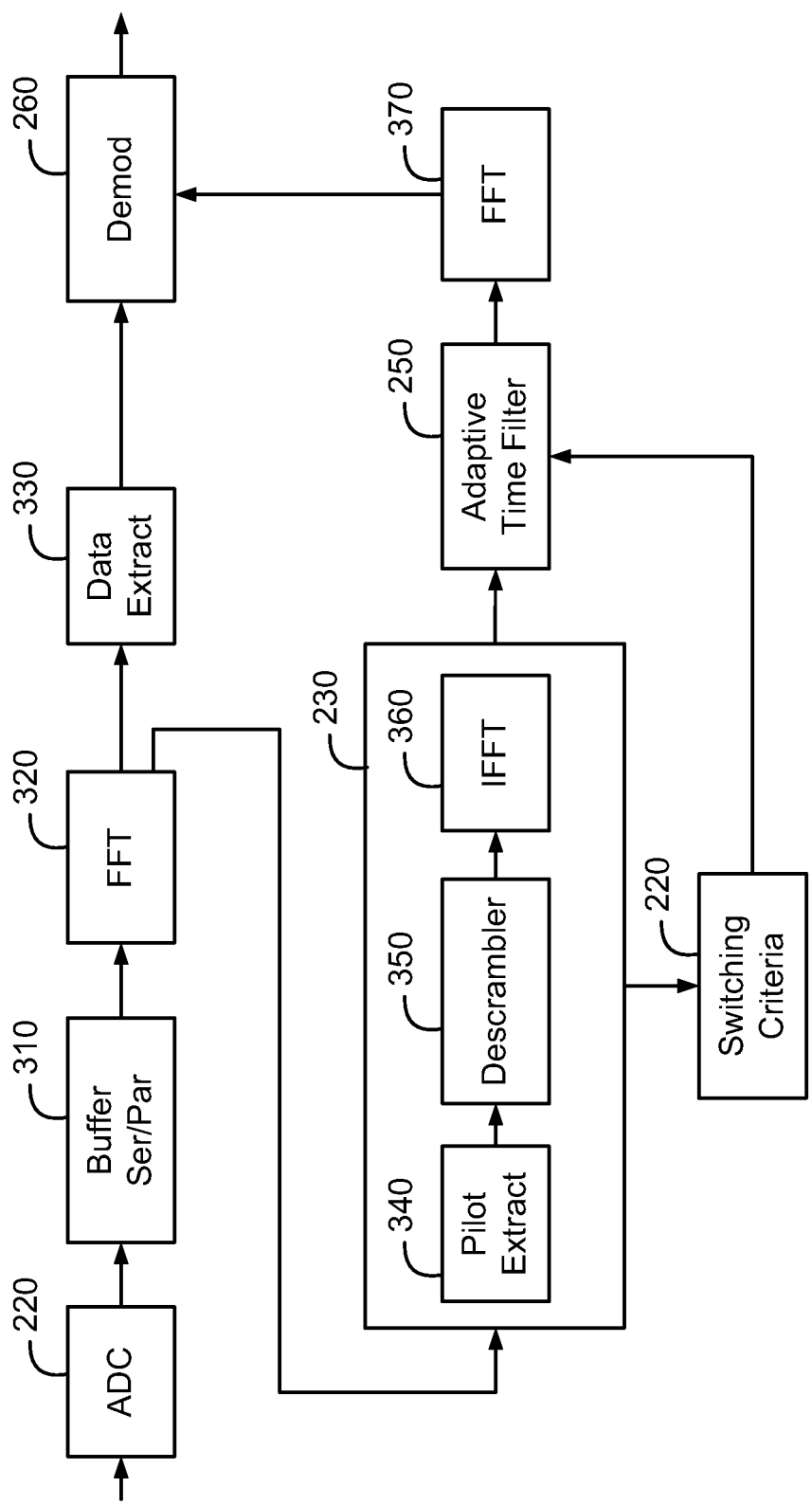
FIG. 3 is a simplified functional block diagram of an embodiment of a portion of an OFDM receiver with adaptive channel estimate time filtering.

FIG. 3 is a simplified functional block diagram of an embodiment of a baseband processing portion 300 of a receiver. The receiver can be, for example, the receiver of FIG. 2. The baseband portion 300 of the receiver is configured for OFDM communications. The baseband portion is configured to operate on an OFDM signal implementing a staggered pilot, and can estimate the channel based on the staggered pilot.

The baseband portion 300 includes an ADC 220 configured to transform an analog representation of the received signal to a digital representation. The output of the ADC 220 is coupled to a serial to parallel converter 310, which can be configured as a buffer. The serial to parallel converter 310 is configured to reformat the serial data stream to a parallel data stream having a plurality of signal paths. The number of signal paths, here denoted as N, is predetermined for the OFDM system and corresponds to the number of distinct tones.

The serial to parallel converter 310 couples the N parallel signal paths to a frequency transformation stage, here depicted as a Fast Fourier Transform (FFT) module 320. The FFT module 320 transforms the N time domain taps to N frequency domain taps. The output of the FFT module 320 can be coupled to a channel estimator 230 as well as a data extraction module 330.

Channel estimator 230 is configured to estimate the channel at each of the frequency taps that corresponds to a pilot tone. The staggered pilot can be configured as P uniformly spaced pilot tones among the N subcarriers. In one embodiment, there may be N=4096 subcarriers and P=512 pilot tones allocated per OFDM symbol. In such an embodiment, the pilot tones are uniformly spaced each eight subcarriers.

Channel estimator 230 includes a pilot extraction module 340 configured to extract those tones from the FFT output corresponding to the pilot tones. The pilot extraction module 340 can be configured to synchronize with the OFDM symbols, such that the proper tones are extracted where the OFDM system uses a staggered pilot.

The output of the pilot extraction module 340 corresponds to a P-wide parallel channel, which can be analyzed as a vector of dimension P. The P pilot signals are coupled to a descrambler 350 that can be configured to descramble the pilot signals and derive the channel estimates corresponding to each of the pilot tones. Each pilot tone can be encoded according to a predetermined pilot sequence and may be phase shifted by a predetermined phase shift that can depend on the assigned subcarrier. The descrambler 350 operates to compensate for any predetermined phase shift and decode the pilot tone in order to recover a frequency domain channel estimate for each frequency.

The output of the descrambler 350 can be coupled to a transform module, here implemented as an Inverse FFT (IFFT) that operates to transform the frequency domain channel estimates to a P tap time domain channel estimate. The dimension of the IFFT can be the same as the dimension of the FFT used to transform the received signals to the frequency domain. The P tap time domain channel estimate is the output of the channel estimator 230.

The output of the channel estimator 230 can be coupled to the adaptive time filter 250 as well as to a switching criteria module 240. The adaptive time filter 250 can be configured, for example, to store coefficients for two separate time filters. A first time filter can be a three tap non-causal time filter having the form:

$$\hat{h}_a(k) = \frac{1}{4}\hat{h}(k-1) + \frac{1}{2}\hat{h}(k) + \frac{1}{4}\hat{h}(k+1).$$

A second time filter can be a single tap filter corresponding to no time filtering. That is, the output of the adaptive time filter 250 corresponds to the channel estimate output from the channel estimator 230.

Switching criteria module 240 can be configured to determine an estimated Doppler spread or relative velocity by examining successive outputs from the channel estimator 230. The switching criteria module 240 can, for example, estimate the time correlation of the channel taps across OFDM symbols. Specifically, the switching criteria module 240 can use the channel estimates across OFDM symbols to calculate the estimated time correlation of the channel. The switching criteria module 240 can compare the estimated channel time correlation against one or more predetermined thresholds to determine if the time-filtering mode needs to be switched, and to determine which time filtering mode to apply. Each of the predetermined thresholds can correspond to a Doppler spread or other similar non-linear time variation of channel taps.

For example, the switching criteria module can be configured to determine a channel time correlation using the equation:

$$r_n = \frac{\sum_k h(n,k)h(n-1,k)}{\sqrt{\sum_k h^2(n,k)} \cdot \sqrt{\sum_k h^2(n-1,k)}}$$

In the time correlation equation, n is the OFDM symbol index, k is the time-domain channel tap index, h(n,k) is the k-th tap of the time-domain channel estimate for symbol n. In the above equation, the channel time correlation is obtained from the channel estimates of two adjacent OFDM symbols.

If an excess channel is available, the adaptive time filter 250 can separately store channel estimates for the excess channel. The switching criteria module 240 can determine if the channel estimate used by the demodulator 260 should include the excess channel estimates or only include the actual channel estimates. The switching criteria module 240 can make the decision to use the excess channel using a variety of factors. For example, the switching criteria may calculate and compare the energy of the actual channel and the energy of the excess channel. The switching criteria module 240 can also estimate the time correlation of the channel. The switching criteria module 240 can use the combination of the energy difference and estimated time correlation of the channel to determine if the excess channel is to be used in the channel estimate.

In another embodiment, the adaptive time filter 250 can implement two or more sets of channel estimation time filtering blocks. The switching criteria module 240 can determine noise estimates at the output of each block and can use the noise estimates to determine which time-filtering mode to select. Similarly, decoding PER (packet-error-rate) or decoding a Bit Error Rate (BER) for all time-filtering blocks can also be used to select the best time-filtering mode.

For example, let h(k) be the time filtered time-domain channel estimate before thresholding, and h̄(k) be the time filtered time-domain channel estimate after the thresholding operation, where k is the index for the time-domain taps. The noise estimate of the time filtered channel estimate can be:

$$\sum_k |h(k) - \tilde{h}(k)|^2$$

The output of the adaptive time filter 250 represents the time domain channel estimates that the baseband portion 300 optimized based on the operating conditions of the receiver. The output of the adaptive time filter 250 is coupled to a transform module, here implemented as an FFT module 370, that transforms the time filtered channel estimates to the frequency domain. The FFT module 370 can be of the same order used to transform the received signal samples to the frequency domain. The output of the FFT module 370 is coupled to the demodulator 260.

As described above, the first FFT module 320 provides the frequency domain subcarrier information to the data extraction module 330. The data extraction module 330 operates on the subcarriers to map the subcarriers carrying information to the demodulator 330. The data extraction module 330 can, for example, couple those subcarriers allocated to data and not allocated to pilot to the demodulator 260. The demodulator 260 uses the optimized frequency domain channel estimates to demodulate the data subcarriers.

Figure 4B:
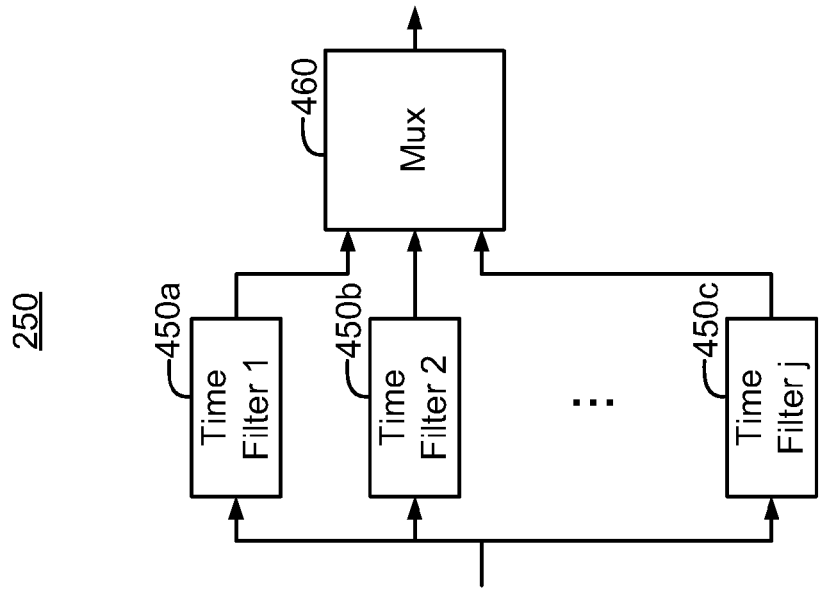
FIGS. 4A-4B are simplified functional block diagrams of embodiments of adaptive time filters.
Figure 4A:
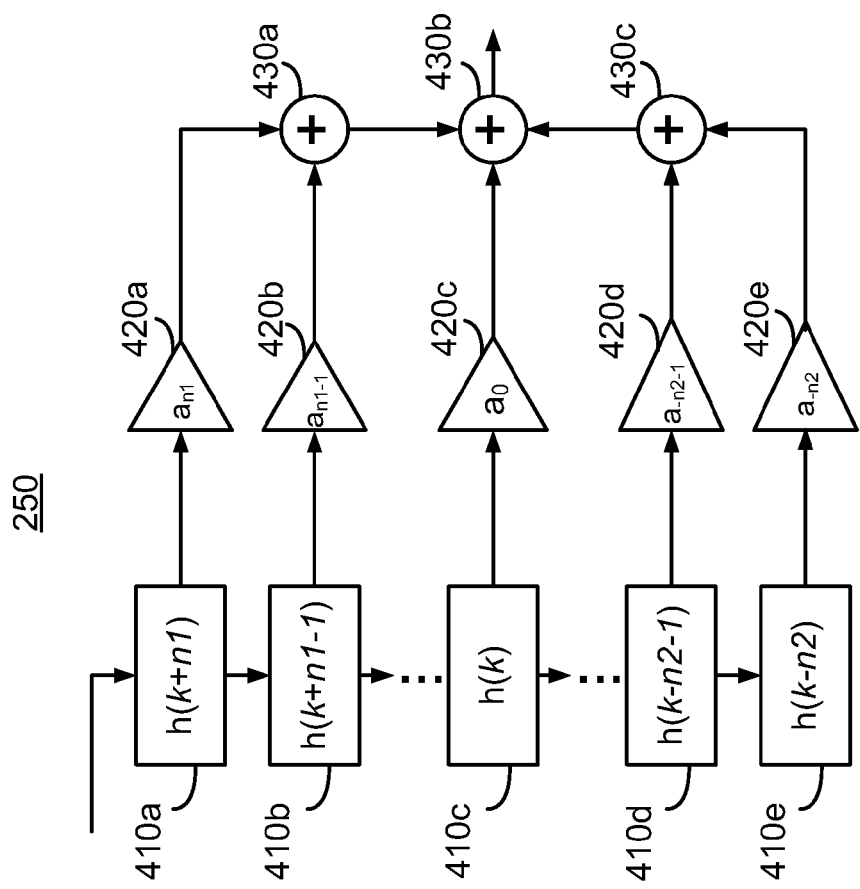

FIGS. 4A-4B are simplified functional block diagrams of embodiments of adaptive time filters 250. The adaptive time filter 250 embodiments can be used, for example, in the receiver shown in FIG. 2 or the baseband portion shown in FIG. 3. The adaptive time filter 250 embodiments can operate on a channel tap basis for those communication systems, such as OFDM communication systems, having more than one channel tap. Therefore, in an OFDM system having 512 channel taps for channel estimation, the adaptive time filter 250 embodiments can be configured to perform vector operations of dimension 512.

An adaptive time filter 250 embodiment shown in FIG. 4A includes a plurality of registers 410a-410e, which may alternatively be implemented as memory locations, buffer locations, and the like, or some other type of storage. The adaptive time filter 250 of FIG. 4A is configured to have the ability to provide a non-causal time filter response of up to n1+n2+1 taps. The adaptive time filter 250 is configured to provide up to n1 non-causal taps and up to n2+1 causal taps. The number of non-causal taps does not need to be substantially the same as the number of causal taps. In other embodiments, the number of non-causal taps can be substantially the same as the number of causal taps. For example, n2 can be set to equal n1 in some embodiments. In other embodiments, the adaptive time filter 250 may be configured to provide only a causal filter response.

Each of the registers 410a-410e can be coupled to a corresponding amplifier 420a-420e. The outputs from the amplifiers 420a-420e are summed in a plurality of summers 430a-430c to provide a single time filtered output.

Storage 422 or memory can be configured to store a plurality of gain coefficients corresponding to a plurality of time filter configurations. One or more of the time filter configurations may have a filter response that is shorter than 2n+1 taps. Therefore, one or more of the coefficients can be zero for some of the time filter configurations.

For time filter configurations shorter than 2n+1 taps, the time filter does not need to store 2n+1 channel estimates in order to provide the time filtered channel estimate. For example, one filter configuration can correspond to a three tap non-causal filter with the tap weights set to (¼, ½, ¼) for the k+1, k, and k−1 channel estimates. If the excess channel is included in the channel estimates, the three tap weights for the excess channel can be (−¼, ½, −¼), and can include a phase shift associated with the excess channel.

For this filter configuration, only three channel estimates are used, and the time filter need only maintain three channel estimate values, one prior value, the value corresponding to the present symbol, and the value corresponding to the next arriving symbol. Another filter configuration can correspond to a single tap filter, which essentially corresponds to no time filtering.

The adaptive time filter 250 can receive a signal or message from the switching criteria module indicating which of the configurations is desired. The adaptive time filter 250 retrieves from storage 422 the coefficients corresponding to the selected configuration, and applies the coefficients to the appropriate gain stages.

In another embodiment, the storage 422 can include one or more generator polynomials and the adaptive time filter 250 can use the one or more generator polynomials to determine the gain coefficients. In this embodiment, the time filter characteristic are not limited to discrete predetermined characteristics, but may vary in a manner that is essentially continuous.

FIG. 4B is another embodiment of an adaptive time filter 250. The adaptive time filter 250 includes a plurality of time filters 450a-450c, each configured to provide a distinct time filter response. The individual time filter responses can be configured to provide a response that is non-causal or causal. In one embodiment, one of the time filters 450a-450c can be configured as a single tap time filter, essentially providing no time filtering of the channel estimates.

Each of the plurality of time filters 450a-450c can have its output coupled to an input port of a switch or multiplexer 460. The multiplexer 460 can include a control input that is controlled by the switching criteria module to select a desired one of the time filter responses.

In one embodiment, the switching criteria module can perform noise estimation at the output of each time filter 450a-450c and use the noise estimate to determine the time-filtering mode that is selected via the multiplexer 460. In another embodiment, the switching criteria module can successively provide each of the channel estimates to a demodulator and the switching criteria module can use decoding PER for each time filter 450a-450c to select the best time-filtering mode.

Figure 5:
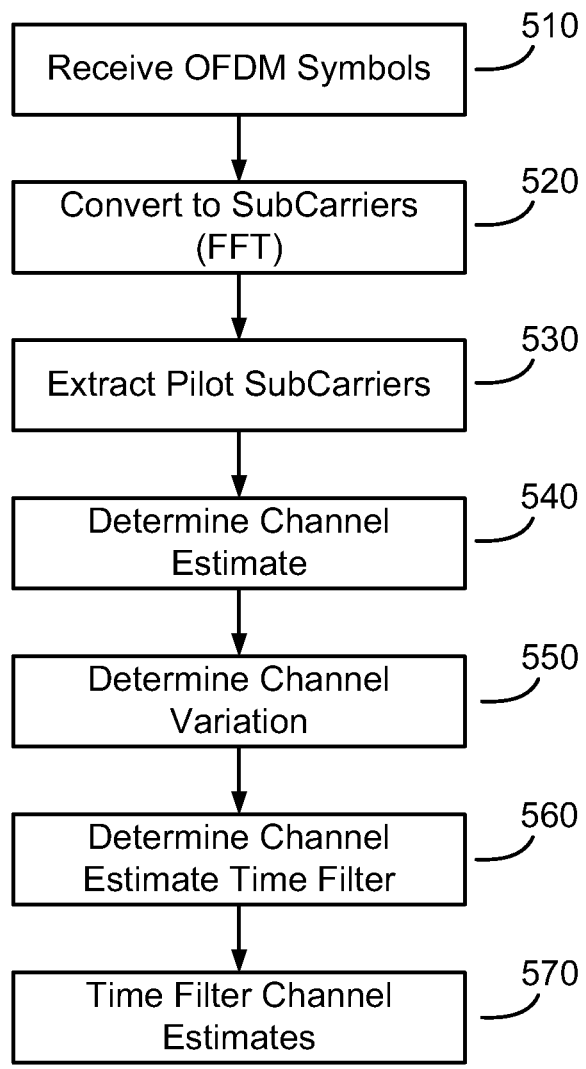
FIG. 5 is a simplified flow chart of an embodiment of a method of adaptive time filtering of channel estimates.

FIG. 5 is a simplified flowchart of an embodiment of a method 500 of adaptive time filtering of channel estimates. The method 500 represents one embodiment of adaptive time filtering of channel estimates based on receiver operating conditions and does not represent the only manner in which a receiver can perform adaptive time filtering of channel estimates.

The method 500 can be performed, for example, by the receiver of FIG. 2 when implemented in a system such as that shown in FIG. 1. For example, a receiver can perform the adaptive time filtering of the channel estimates derived from signals broadcast by the wireless station. The method 500 describes operation of a receiver in an OFDM system having a subset the total number of subcarriers allocated as pilot tones during each symbol.

The method 500 begins at block 510 where the receiver receives OFDM symbols, for example, from a wireless station. As described above, the OFDM symbols may include a staggered pilot, where a subset, P, of the total number of available subcarriers, N, is configured as a pilot.

The receiver proceeds to block 520 and transforms the time domain samples, or taps, into a frequency domain representation. The receiver can implement an FFT to transform the time domain taps to the corresponding frequency domain subcarriers.

The receiver proceeds to block 530 and extracts the pilot subcarriers from the FFT output. In the case of a staggered pilot, the identity of the pilot subcarriers can follow a predetermined pattern. The receiver can synchronize with the symbol timing in order to accurately determine which subcarriers within a received symbol correspond to the pilot subcarriers.

The receiver proceeds to block 540 and determines the channel estimate corresponding to the extracted pilot subcarriers. The pilot is a known sequence. Therefore, the receiver can use the a priori knowledge of the transmitted signal when determining the channel estimate. The receiver can descramble each of the pilot subcarriers according to its predetermined pilot sequence. The result is the frequency domain channel estimate. The receiver can transform the channel estimates to the frequency domain in order to determine a channel estimate vector having P distinct channel estimates corresponding to P time domain taps.

The receiver proceeds to block 550 and determines an operating condition of the receiver. For example, the receiver can determine the channel variation across symbols. The receiver can store the channel estimates in memory or some other storage and can compare the channel estimates across two or more symbols. The receiver can, for example, determine a time correlation of channel estimates across symbols and can compare the correlation against one or more thresholds. Each threshold can correspond, for example, to a level of channel time variation that can be optimally compensated using one of a plurality of distinct channel time filters. Thus, the range of correlations can correspond to a particular time filter configuration. The receiver can correlate the channel estimates on a per-tap basis for a system, such as an OFDM system, having a channel estimate of greater than one dimension.

As an example, a low correlation of channel estimates across symbols can suggest a large linear channel variation, which can be a combination of both linear and non-linear channel variation. The channel time variation can be due to Doppler spreading attributable to a relatively large Doppler spread. In such an operating environment, the demodulator performance may be improved by substantially reducing or eliminating time filtering of channel estimates.

After determining the channel variation, the receiver proceeds to block 560 and determines a channel estimate time filter configuration based on the variation. As described above, each range of channel time correlation values can correspond to a distinct time filter configuration. One of the time filter configurations can correspond to a single tap time filter, which essentially corresponds to no time filtering of the channel estimates. Where the selected channel estimate time filter corresponds to a non-causal filter, the receiver may need to buffer, or otherwise store, the channel estimates as well as all of the signal subcarrier values for a number of symbols sufficient for the determination of the non-causal time filter value.

The receiver proceeds to block 570 and configures an adaptive time filter to the desired configuration. The receiver then filters the channel estimates according to the time filter.

Apparatus for performing adaptive time filtering of channel estimates and method for implementing adaptive time filtering have been described. A receiver can determine multiple channel estimates over time and can adaptively time filter the channel estimates based at least in part on a receiver operating environment. The receiver can implement a plurality of predetermined time filter configurations and select one of the time filter configurations based on the operating environment. The receiver can determine the operating environment independently or may receive some external control or input that indicates the operating environment.

A method of obtaining channel estimates for decoding signals from a communication link in a wireless communication system may include determining a channel time variation, varying a channel estimate time filter characteristic based in part on the channel time variation, and filtering at least one channel estimate according to the channel estimate time filter characteristic. The determining the channel variation may include determining a first channel estimate corresponding to a first received symbol, determining a second channel estimate corresponding to a second received symbol, correlating the first channel estimate with the second channel estimate to determine a channel correlation, and comparing the channel correlation to at least one predetermined threshold. The at least one predetermined threshold may include at least one predetermined threshold based in part on a receive operating frequency band. The determining the channel variation may include determining a variation in a plurality of distinct channel estimates, each channel estimate comprising an actual channel estimate and an excess channel estimate. The determining the channel variation may include determining a variation over a plurality of distinct channel estimates, each channel estimate based on a staggered pilot signal received during Orthogonal Frequency Division Multiplex (OFDM) symbols. The determining the channel time variation may include estimating a Doppler spread of the channel. The determining the channel time variation may include determining the channel variation for a plurality of subcarriers of distinct Orthogonal Frequency Division Multiplex (OFDM) symbols. The determining the channel time variation may include determining a frequency domain time variation of at least one subcarrier over distinct Orthogonal Frequency Division Multiplex (OFDM) symbols. The determining the channel time variation may include determining a variation of a time domain tap over distinct Orthogonal Frequency Division Multiplex (OFDM) symbols. The determining the channel time variation may include estimating a time correlation of a time domain tap over distinct Orthogonal Frequency Division Multiplex (OFDM) symbols. The varying the channel estimate time filter characteristic may include varying the number of taps of a channel estimate time filter. The varying the channel estimate time filter characteristic may include varying at least one tap coefficient of a channel estimate time filter. The varying the at least one tap coefficient may include selecting at least one tap coefficient from a plurality of predetermined tap coefficients. The varying the channel estimate time filter characteristic may include selecting one of a plurality of predetermined channel estimate time filter characteristics. The varying the channel estimate time filter characteristic may include selecting one of a three tap time filter and a single tap time filter. The varying the channel estimate time filter characteristic may include selecting one of a non-causal multi-tap time filter and a single tap filter. The determining the channel variation may include determining a correlation of channel estimates across distinct symbols, and the varying the channel estimate time filter characteristic may include selecting one of a predetermined number of channel estimate time filter characteristics based on the correlation.

A method of optimizing channel estimates for decoding signals from a communication link in a wireless communication system may include filtering a channel estimate using each of a plurality of channel estimation time filters to generate a plurality of time filtered channel estimates, selecting one of the plurality of channel estimation time filters, and decoding a received symbol using a time filtered channel estimate from the selected one of the plurality of channel estimation time filters. The filtering the channel estimate using each of the plurality of channel estimation time filters may include time filtering the channel estimate using at least one additional distinct channel estimate in a multi-tap time filter, time filtering the channel estimate using a single tap filter. The filtering the channel estimate using each of the plurality of channel estimation time filters may include time filtering the channel estimate in a non-causal multi-tap time filter, and time filtering the channel estimate using a causal time filter. The selecting one of the plurality of channel estimation time filters may include determining a noise estimate at an output of each of the plurality of channel estimation time filters, and selecting the one of the plurality of channel estimation time filters based on the noise estimates. The selecting one of the plurality of channel estimation time filters may include decoding the received symbol using each of the plurality of channel estimation time filters, determining an error rate value at an output of each of the plurality of channel estimation time filters, and selecting the one of the plurality of channel estimation time filters based on the plurality of error rate values. The error rate may include a Packet Error Rate (PER). The error rate may include a Bit Error Rate (BER). The selecting one of the plurality of channel estimation time filters may include receiving a control input indicative of an operating mode, and selecting the one of the plurality of channel estimation time filters based on the operating mode. The control input may be received via a user interface. The selecting one of the plurality of channel estimation time filters may include determining a receive operating frequency band, and selecting the one of the plurality of channel estimation time filters based on the receive operating frequency band.

A method of optimizing channel estimates for decoding signals from a communication link in a wireless communication system, the method may include receiving an Orthogonal Frequency Division Multiplex (OFDM) symbol comprising at least one pilot subcarrier, converting the received symbol to a plurality of subcarriers, extracting at least one pilot subcarrier corresponding to the pilot, determining a channel estimate based at least in part on the at least one pilot subcarrier, determining a channel variation based on the channel estimate, controlling a time filter to provide a channel estimate time filter response based on the channel variation, and filtering the channel estimate with the time filter.

An apparatus for optimizing channel estimates for decoding signals from a communication link in a wireless communication system, the apparatus may include a receiver front end configured to receive a symbol over the communication link, a channel estimator coupled to the receiver and configured to determine a channel estimate based on the received symbol, an adaptive time filter coupled to the channel estimator and configured to time filter the channel estimate, and a switching criteria module coupled to the adaptive time filter and configured to control a time filtering characteristic of the adaptive time filter. The receiver front end may be configured to receive an Orthogonal Frequency Division Multiplex (OFDM) symbol. The receiver front end may include a selectively tunable Local Oscillator (LO). The channel estimator may be configured to determine the channel estimate based on a predetermined portion of the received symbol. The channel estimator may be configured to determine the channel estimate based on a pilot signal included in the received symbol. The channel estimator may include a pilot extraction module configured to extract at least one frequency subcarrier from a plurality of subcarriers corresponding to a pilot subcarrier, and a descrambler coupled to the pilot extraction module and configured to descramble the at least one frequency subcarrier. The apparatus may further include a transform module coupled to the descrambler and configured to transform the at least one frequency subcarrier to a time domain signal. The adaptive time filter may include a reconfigurable multi-tap time filter. The reconfigurable multi-tap time filter may include a plurality of amplifiers and each amplifier may have a tap weight selectable from a plurality of predetermined plurality of tap weights. The adaptive time filter may include a time filter alternatively configurable to one of a multi-tap time filter or a single tap filter. The adaptive time filter may include a plurality of time filters, and each time filter having a distinct time filter characteristic. The adaptive time filter may include a non-causal multi-tap time filter, and a single tap time filter having an input coupled to in common with an input of the non-causal multi-tap time filter. The switching criteria module may be coupled to the channel estimator and may be configured to control the time filtering characteristic based on a correlation of the received symbol with a previously received symbol. The switching criteria module may be configured to determine a noise estimate corresponding to each of a plurality of time filtering characteristics, and may control the time filtering characteristic of the adaptive time filter based on the noise estimates. The apparatus may further include a demodulator coupled to the adaptive time filter and configured to demodulate the received symbol based on a time filtered channel estimate. The switching criteria module may be configured to determine a Packet Error Rate (PER) value of the demodulator for each of a plurality of time filter characteristics, and controls the time filter characteristic based on the PER values.

An apparatus for optimizing channel estimates for decoding signals from a communication link in a wireless communication system, the apparatus may include a first transform module configured to transform a plurality of time domain samples to a plurality of frequency domain subcarriers, a channel estimator coupled to the first transform module and configured to operate on a first subset of the frequency domain subcarriers to generate a channel estimate, an adaptive time filter coupled to the channel estimator and configured to time filter the channel estimate to produce a time filtered channel estimate, a switching criteria module configured to determine an operating condition and control a time filtering characteristic of the adaptive time filter, a data extraction module coupled to the first transform module and configured to extract a second subset of the plurality of frequency domain subcarriers corresponding to data subcarriers, and a demodulator coupled to the data extraction module and the adaptive time filter and configured to demodulate the data subcarriers using the time filtered channel estimate. The apparatus may include a second transform module coupling the adaptive filter to the demodulator, and the second transform filter may be configured to transform the time filtered channel estimate to a frequency domain representation. The channel estimator may include a descrambler configured to descramble each of the first subset of the frequency domain subcarriers to generate frequency domain channel estimates, and an inverse transform module configured to transform the frequency domain channel estimates to time domain channel estimates. The adaptive time filter may include a reconfigurable multi-tap time filter. The adaptive time filter may include a plurality of time filters, and each time filter having a distinct time filter characteristic. The switching criteria module may determine the operating condition by correlating the channel estimate with at least one additional distinct channel estimate. The switching criteria module may determine the operating condition by receiving a software control indicative of the operating condition. The switching criteria module may determine the operating condition based on a comparison of a plurality of noise estimates, each noise estimate corresponding to a particular time filtering characteristic. The switching criteria module may determine the operating condition based on a comparison of a plurality of Packet Error Rate (PER) values, and each PER value may correspond to a particular time filtering characteristic.

An apparatus for optimizing channel estimates for decoding signals from a communication link in a wireless communication system, the apparatus may include means for determining a channel variation, means for varying a channel estimate time filter characteristic based in part on the channel variation, and means for filtering at least one channel estimate according to the channel estimate time filter characteristic.

The means for determining the channel variation may include means for determining a variation over a plurality of distinct channel estimates, each channel estimate based on a staggered pilot signal received during an Orthogonal Frequency Division Multiplex (OFDM) symbol. The means for varying the channel estimate time filter characteristic may include means for varying at least one tap coefficient of the means for filtering at least one channel estimate.

An apparatus for optimizing channel estimates for decoding signals from a communication link in a wireless communication system, the apparatus may include means for filtering a channel estimate according to a plurality of channel estimation time filter characteristics to generate a plurality of time filtered channel estimates, means for selecting one of the plurality of channel estimation time filters, and means for demodulating a received symbol using a time filtered channel estimate from the selected one of the plurality of channel estimation time filters. The means for selecting one of the plurality of channel estimation time filters may include means for determining a noise estimate corresponding to each of the plurality of channel estimation time filter characteristics, and means for selecting the one of the plurality of channel estimation time filter characteristics based on the noise estimates. The means for selecting one of the plurality of channel estimation time filters may include means for demodulating the received symbol using each of the plurality of channel estimation time filter characteristics, means for determining a packet error rate (PER) value corresponding to each of the plurality of channel estimation time filter characteristics, and means for selecting the one of the plurality of channel estimation time filter characteristics based on the plurality of PER values. The means for selecting one of the plurality of channel estimation time filters may include means for receiving a control input indicative of an operating mode, and means for selecting the one of the plurality of channel estimation time filter characteristics based on the operating mode.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of obtaining channel estimates for decoding signals from a communication link in a wireless communication system, the method comprising:
   determining a channel time variation comprising a variation in a plurality of distinct channel estimates, each channel estimate including an actual channel estimate and an excess channel estimate;
   varying a channel estimate time filter characteristic based in part on the channel time variation; and
   filtering at least one channel estimate according to the channel estimate time filter characteristic.

2. The method of claim 1, wherein determining the channel time variation comprises:
   determining a first channel estimate corresponding to a first received symbol;
   determining a second channel estimate corresponding to a second received symbol;
   correlating the first channel estimate with the second channel estimate to determine a channel correlation; and
   comparing the channel correlation to at least one predetermined threshold.

3. The method of claim 2, wherein the at least one predetermined threshold comprises at least one predetermined threshold based in part on a receive operating frequency band.

4. The method of claim 1, wherein each channel estimate is based on a staggered pilot signal received during Orthogonal Frequency Division Multiplex (OFDM) symbols.

5. The method of claim 1, wherein determining the channel time variation comprises determining the channel variation for a plurality of subcarriers of distinct Orthogonal Frequency Division Multiplex (OFDM) symbols.

6. The method of claim 1, wherein determining the channel time variation comprises determining a frequency domain time variation of at least one subcarrier over distinct Orthogonal Frequency Division Multiplex (OFDM) symbols.

7. The method of claim 1, wherein varying the channel estimate time filter characteristic comprises varying the number of taps of a channel estimate time filter.

8. The method of claim 1, wherein determining the channel time variation comprises determining a correlation of channel estimates across distinct symbols, and wherein varying the channel estimate time filter characteristic comprises selecting one of a predetermined number of channel estimate time filter characteristics based on the correlation.

9. A method of optimizing channel estimates for decoding signals from a communication link in a wireless communication system, the method comprising:
   filtering a channel estimate using each of a plurality of channel estimation time filters to generate a plurality of time filtered channel estimates;

decoding a received symbol using each of the plurality of channel estimation time filters;

determining an error rate value at an output of each of the plurality of channel estimation time filters;

selecting one of the plurality of channel estimation time filters based on the plurality of error rate values; and decoding the received symbol using a time filtered channel estimate from the selected one of the plurality of channel estimation time filters.

10. The method of claim 9, wherein selecting one of the plurality of channel estimation time filters comprises:

determining a noise estimate at an output of each of the plurality of channel estimation time filters; and selecting the one of the plurality of channel estimation time filters based on the noise estimates.

11. An apparatus for optimizing channel estimates for decoding signals from a communication link in a wireless communication system, the apparatus comprising:

a receiver front end configured to receive a symbol over the communication link;

a channel estimator coupled to the receiver front end and configured to determine a channel estimate based on the received symbol;

an adaptive time filter coupled to the channel estimator and configured to time filter the channel estimate, the adaptive time filter including a non-causal multi-tap time filter and a single tap time filter having a common input; and a switching criteria module coupled to the adaptive time filter and configured to control a time filtering characteristic of the adaptive time filter.

12. The apparatus of claim 11, wherein the channel estimator is configured to determine the channel estimate based on a predetermined portion of the received symbol.

13. The apparatus of claim 11, wherein the channel estimator comprises:

a pilot extraction module configured to extract at least one frequency subcarrier from a plurality of subcarriers corresponding to a pilot subcarrier; and a descrambler coupled to the pilot extraction module and configured to descramble the at least one frequency subcarrier.

14. The apparatus of claim 13, further comprising a transform module coupled to the descrambler and configured to transform the at least one frequency subcarrier to a time domain signal.

15. The apparatus of claim 11, wherein the switching criteria module is coupled to the channel estimator and is configured to control the time filtering characteristic based on a correlation of the received symbol with a previously received symbol.

16. The apparatus of claim 11, wherein the switching criteria module is configured to determine a noise estimate corresponding to each of a plurality of time filtering characteristics, and controls the time filtering characteristic of the adaptive time filter based on the noise estimates.

17. The apparatus of claim 11, further comprising a demodulator coupled to the adaptive time filter and configured to demodulate the received symbol based on a time filtered channel estimate.

18. The apparatus of claim 11, wherein the switching criteria module is configured to control a number of taps of the adaptive time filter.

19. An apparatus for obtaining channel estimates for decoding signals, the apparatus comprising:

means for receiving a symbol over a communication link;

means for determining a channel estimate based on the received symbol;

means for time filtering the channel estimate; and means for controlling a time filtering characteristic of the adaptive time filter, wherein the means for determining the channel estimate comprises:

means for extracting at least one frequency subcarrier from a plurality of subcarriers corresponding to a pilot subcarrier; and means for descrambling the at least one frequency subcarrier.

20. A non-transitory computer readable medium embodying instructions that, when executed by a processor, allow the processor to perform a method that obtains channel estimates for decoding signals, the method comprising:

determining a channel time variation by correlating a first channel estimate corresponding to a first received symbol with a second channel estimate corresponding to a second received symbol;

comparing the channel time variation to at least one threshold;

varying a channel estimate time filter characteristic based in part on whether the channel time variation satisfies the at least one threshold; and filtering at least one channel estimate according to the channel estimate time filter characteristic.

21. An apparatus for obtaining channel estimates for decoding signals from a communication link in a wireless communication system, the apparatus comprising:

a determiner to determine a channel time variation comprising a variation in a plurality of distinct channel estimates, each channel estimate including an actual channel estimate and an excess channel estimate;

a switch to vary a channel estimate time filter characteristic based in part on the channel time variation; and a filter to filter at least one channel estimate according to the channel estimate time filter characteristic.

22. The apparatus of claim 21, wherein the determiner is configured to:

determine a first channel estimate corresponding to a first received symbol;

determine a second channel estimate corresponding to a second received symbol;

correlate the first channel estimate with the second channel estimate to determine a channel correlation; and compare the channel correlation to at least one predetermined threshold.

23. The apparatus of claim 22, wherein the at least one predetermined threshold comprises at least one predetermined threshold based in part on a receive operating frequency band.

24. The apparatus of claim 21, wherein each channel estimate is based on a staggered pilot signal received during Orthogonal Frequency Division Multiplex (OFDM) symbols.

25. The apparatus of claim 21, wherein the determiner is configured to determine the channel variation for a plurality of subcarriers of distinct Orthogonal Frequency Division Multiplex (OFDM) symbols.

26. The apparatus of claim 21, wherein the determiner is configured to determine a frequency domain time variation of at least one subcarrier over distinct Orthogonal Frequency Division Multiplex (OFDM) symbols.

27. The apparatus of claim 21, wherein the switch is configured to vary the number of taps of a channel estimate time filter.

28. The apparatus of claim 21, wherein the determiner is configured to determine a correlation of channel estimates across distinct symbols and the switch is configured to select one of a predetermined number of channel estimate time filter characteristics based on the correlation.

29. An apparatus for obtaining channel estimates for decoding signals from a communication link in a wireless communication system, the apparatus comprising:
means for determining a channel time variation comprising a variation in a plurality of distinct channel estimates, each channel estimate including an actual channel estimate and an excess channel estimate;
means for varying a channel estimate time filter characteristic based in part on the channel time variation; and
means for filtering at least one channel estimate according to the channel estimate time filter characteristic.

30. The apparatus of claim 29, wherein the means for determining comprises:
means for determining a first channel estimate corresponding to a first received symbol;
means for determining a second channel estimate corresponding to a second received symbol;
means for correlating the first channel estimate with the second channel estimate to determine a channel correlation; and
means for comparing the channel correlation to at least one predetermined threshold.

31. The apparatus of claim 30, wherein the at least one predetermined threshold comprises at least one predetermined threshold based in part on a receive operating frequency band.

32. The apparatus of claim 29, wherein each channel estimate is based on a staggered pilot signal received during Orthogonal Frequency Division Multiplex (OFDM) symbols.

33. The apparatus of claim 29, wherein the means for determining comprises means to determine the channel variation for a plurality of subcarriers of distinct Orthogonal Frequency Division Multiplex (OFDM) symbols.

34. The apparatus of claim 29, wherein the means for determining comprises means to determine a frequency domain time variation of at least one subcarrier over distinct Orthogonal Frequency Division Multiplex (OFDM) symbols.

35. The apparatus of claim 29, wherein the switch is configured to vary the number of taps of a channel estimate time filter.

36. The apparatus of claim 29, wherein the means for determining comprises means to determine a correlation of channel estimates across distinct symbols and the means for varying comprises means to select one of a predetermined number of channel estimate time filter characteristics based on the correlation.

37. A non-transitory computer readable medium embodying instructions that, when executed by a processor, allow the processor to perform a method for decoding signals from a communication link in a wireless communication system, the method comprising:
determining a channel time variation comprising a variation in a plurality of distinct channel estimates, each channel estimate including an actual channel estimate and an excess channel estimate;
varying a channel estimate time filter characteristic based in part on the channel time variation; and
filtering at least one channel estimate according to the channel estimate time filter characteristic.

38. The non-transitory computer readable medium of claim 37, wherein the determining the channel time variation comprises:
determining a first channel estimate corresponding to a first received symbol;
determining a second channel estimate corresponding to a second received symbol;
correlating the first channel estimate with the second channel estimate to determine a channel correlation; and
comparing the channel correlation to at least one predetermined threshold.

39. The non-transitory computer readable medium of claim 38, wherein the at least one predetermined threshold comprises at least one predetermined threshold based in part on a receive operating frequency band.

40. The non-transitory computer readable medium of claim 37, wherein each channel estimate is based on a staggered pilot signal received during Orthogonal Frequency Division Multiplex (OFDM) symbols 41. The non-transitory computer readable medium of claim 37, wherein the determining the channel time variation comprises determining the channel variation for a plurality of subcarriers of distinct Orthogonal Frequency Division Multiplex (OFDM) symbols.

42. The non-transitory computer readable medium of claim 37, wherein the determining the channel time variation comprises determining a frequency domain time variation of at least one subcarrier over distinct Orthogonal Frequency Division Multiplex (OFDM) symbols.

43. The non-transitory computer readable medium of claim 37, wherein the varying the channel estimate time filter characteristic comprises varying the number of taps of a channel estimate time filter.

44. The non-transitory computer readable medium of claim 37, wherein the determining the channel time variation comprises determining a correlation of channel estimates across distinct symbols, and wherein the varying the channel estimate time filter characteristic comprises selecting one of a predetermined number of channel estimate time filter characteristics based on the correlation.

45. An apparatus for optimizing channel estimates for decoding signals from a communication link in a wireless communication system, the apparatus comprising:
a filter to filter a channel estimate using each of a plurality of channel estimation time filters to generate a plurality of time filtered channel estimates;
a decoder to decode a received symbol using each of the plurality of channel estimation time filters;
a determiner to determine an error rate value at an output of each of the plurality of channel estimation time filters;
a selector to select one of the plurality of channel estimation time filters based on the plurality of error rate values; and
the decoder further configured to decode the received symbol using a time filtered channel estimate from the selected one of the plurality of channel estimation time filters.

46. The apparatus of claim 45, wherein the selector is configured to:
determine a noise estimate at an output of each of the plurality of channel estimation time filters; and
select the one of the plurality of channel estimation time filters based on the noise estimates.

47. An apparatus for optimizing channel estimates for decoding signals from a communication link in a wireless communication system, the apparatus comprising:
means for filtering a channel estimate using each of a plurality of channel estimation time filters to generate a plurality of time filtered channel estimates;

means for decoding a received symbol using each of the plurality of channel estimation time filters;

means for determining an error rate value at an output of each of the plurality of channel estimation time filters;

means for selecting one of the plurality of channel estimation time filters based on the plurality of error rate values; and means for decoding the received symbol using a time filtered channel estimate from the selected one of the plurality of channel estimation time filters.

48. The apparatus of claim 47, wherein the means for selecting comprises:

means for determining a noise estimate at an output of each of the plurality of channel estimation time filters; and means for selecting the one of the plurality of channel estimation time filters based on the noise estimates.

49. A non-transitory computer readable medium embodying instructions that, when executed by a processor, allow the processor to perform a method of optimizing channel estimates for decoding signals from a communication link in a wireless communication system, the method comprising:

filtering a channel estimate using each of a plurality of channel estimation time filters to generate a plurality of time filtered channel estimates;

decoding a received symbol using each of the plurality of channel estimation time filters;

determining an error rate value at an output of each of the plurality of channel estimation time filters;

selecting one of the plurality of channel estimation time filters based on the plurality of error rate values; and decoding the received symbol using a time filtered channel estimate from the selected one of the plurality of channel estimation time filters.

50. The non-transitory computer readable medium of claim 49, wherein the selecting one of the plurality of channel estimation time filters comprises:

determining a noise estimate at an output of each of the plurality of channel estimation time filters; and selecting the one of the plurality of channel estimation time filters based on the noise estimates.

51. A method of optimizing channel estimates for decoding signals from a communication link in a wireless communication system, the method comprising:

receiving a symbol over the communication link;

determining a channel estimate based on the received symbol;

time filtering the channel estimate with an adaptive time filter comprising a non-causal multi-tap time filter and a single tap time filter having a common input; and controlling a time filtering characteristic of the adaptive time filter.

52. The method of claim 51, wherein the determining the channel estimate is based on a predetermined portion of the received symbol.

53. The method of claim 51, wherein the determining the channel estimate comprises:

extracting at least one frequency subcarrier from a plurality of subcarriers corresponding to a pilot subcarrier; and descrambling the at least one frequency subcarrier.

54. The method of claim 53, further comprising transforming the at least one frequency subcarrier to a time domain signal.

55. The method of claim 51, wherein the controlling a time filtering characteristic is based on a correlation of the received symbol with a previously received symbol.

56. The method of claim 51, wherein the controlling the time filtering characteristic comprises:

determining a noise estimate corresponding to each of a plurality of time filtering characteristics; and controlling the time filtering characteristic of the adaptive time filter based on the noise estimates.

57. The method of claim 51, further comprising demodulating the received symbol based on a time filtered channel estimate.

58. The method of claim 51, wherein the controlling the time filtering characteristic comprises controlling a number of taps of the adaptive time filter.

59. An apparatus for optimizing channel estimates for decoding signals from a communication link in a wireless communication system, the apparatus comprising:

means to receive a symbol over the communication link;

means to determine a channel estimate based on the received symbol;

means to adaptively time filter the channel estimate comprising a non-causal multi-tap time filter means and a single tap time filter means having a common input; and means to control a time filtering characteristic of the means to adaptively time filter the channel estimate.

60. The apparatus of claim 59, wherein the means to determine a channel estimate is configured to determine the channel estimate based on a predetermined portion of the received symbol.

61. The apparatus of claim 59, wherein the means to determine a channel estimate comprises:

means to extract at least one frequency subcarrier from a plurality of subcarriers corresponding to a pilot subcarrier; and means to descramble the at least one frequency subcarrier.

62. The apparatus of claim 61, further comprising means to transform the at least one frequency subcarrier to a time domain signal.

63. The apparatus of claim 59, wherein the means to control the time filtering characteristic is configured to control the time filtering characteristic based on a correlation of the received symbol with a previously received symbol.

64. The apparatus of claim 59, wherein the means to control the time filtering characteristic comprises means to determine a noise estimate corresponding to each of a plurality of time filtering characteristics and means to control the time filtering characteristic of the adaptive time filtering means based on the noise estimates.

65. The apparatus of claim 59, further comprising means to demodulate the received symbol based on a time filtered channel estimate.

66. The apparatus of claim 59, wherein the means to control the time filtering characteristic comprises means to control a number of taps of the adaptive time filtering means.

67. A non-transitory computer readable medium embodying instructions that, when executed by a processor, allow the processor to perform a method of optimizing channel estimates for decoding signals from a communication link in a wireless communication system, the method comprising:

receiving a symbol over the communication link;

determining a channel estimate based on the received symbol;

time filtering the channel estimate with an adaptive time filter comprising a non-causal multi-tap time filter and a single tap time filter having a common input; and controlling a time filtering characteristic of the adaptive time filter.

68. The non-transitory computer readable medium of claim 67, wherein the determining the channel estimate is based on a predetermined portion of the received symbol.

69. The non-transitory computer readable medium of claim 67, wherein the determining the channel estimate comprises:
extracting at least one frequency subcarrier from a plurality of subcarriers corresponding to a pilot subcarrier; and
descrambling the at least one frequency subcarrier.

70. The non-transitory computer readable medium of claim 67, the method further comprising transforming the at least one frequency subcarrier to a time domain signal.

71. The non-transitory computer readable medium of claim 67, wherein the controlling the time filtering characteristic is based on a correlation of the received symbol with a previously received symbol.

72. The non-transitory computer readable medium of claim 67, wherein the controlling the time filtering characteristic comprises:
determining a noise estimate corresponding to each of a plurality of time filtering characteristics; and
controlling the time filtering characteristic of the adaptive time filter based on the noise estimates.

73. The non-transitory computer readable medium of claim 67, the method further comprising demodulating the received symbol based on a time filtered channel estimate.

74. The non-transitory computer readable medium of claim 67, wherein the controlling the time filtering characteristic comprises controlling a number of taps of the adaptive time filter.

* * * * *